US011908411B1

(12) United States Patent
Fan et al.

(10) Patent No.: US 11,908,411 B1
(45) Date of Patent: Feb. 20, 2024

(54) DISPLAY PANEL AND PIXEL DRIVING METHOD

(71) Applicant: HKC CORPORATION LIMITED, Shenzhen (CN)

(72) Inventors: Tao Fan, Shenzhen (CN); Rongrong Li, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/329,036

(22) Filed: Jun. 5, 2023

(30) Foreign Application Priority Data

Dec. 1, 2022 (CN) ......................... 202211526357.4

(51) Int. Cl.
*G09G 3/3233* (2016.01)
*G09G 3/3291* (2016.01)

(52) U.S. Cl.
CPC ......... *G09G 3/3233* (2013.01); *G09G 3/3291* (2013.01); *G09G 2300/0426* (2013.01); *G09G 2330/021* (2013.01)

(58) Field of Classification Search
CPC ............... G09G 3/3233; G09G 3/3291; G09G 2300/0426; G09G 2330/021
See application file for complete search history.

(56) References Cited

U.S. PATENT DOCUMENTS

2015/0084843 A1* 3/2015 Li ........................ G09G 3/3233 345/76
2018/0342199 A1* 11/2018 Zhou ........................ G09G 3/32
2019/0130828 A1* 5/2019 Li ........................ G09G 3/3233
2019/0164492 A1* 5/2019 Oh ........................ G09G 3/3258

FOREIGN PATENT DOCUMENTS

CN 1577453 2/2005
CN 103440841 12/2013
CN 104575395 4/2015
CN 107016956 8/2017

OTHER PUBLICATIONS

CNIPA, First Office Action for CN Application No. 202211526357.4, dated Jan. 10, 2023.
CNIPA, Notification to Grant Patent Right for Invention for CN Application No. 202211526357.4, dated Feb. 16, 2023.

* cited by examiner

*Primary Examiner* — Grant Sitta
(74) *Attorney, Agent, or Firm* — Hodgson Russ LLP

(57) ABSTRACT

A display panel includes a plurality of pixel driving circuits arranged in an array along a row direction and a column direction. The display panel further comprises a plurality of first control lines, a plurality of second control lines, a plurality of data lines, and a plurality of power lines. Each of the pixel driving circuits is correspondingly connected to the first control line, the second control line, the data line, and two power lines, and the two power lines comprises a first power line and a second power line. The pixel driving circuit includes: a driving transistor, a storage capacitor, a sampling compensation assembly, a first switch assembly, a second switch assembly and a light emitting device.

16 Claims, 3 Drawing Sheets

DISPLAY PANEL AND PIXEL DRIVING METHOD

CROSS-REFERENCE TO RELATED APPLICATIONS

This application claims priority to Chinese Patent Application No. 202211526357.4, filed Dec. 1, 2022, the entire contents of which are incorporated herein by reference.

TECHNICAL FIELD

The present disclosure relates to the technical field of display, and more particularly, to a display panel and a pixel driving method.

BACKGROUND

Generally, the brightness of OLED (Organic Light Emitting Diode) mainly depends on the magnitude of its driving current, the greater the current, the greater the brightness, so the OLED device has high requirements for the stability of driving transistors.

In practical applications, due to the non-uniformity of the threshold voltage of the driving transistor, which will drift with the increase of the operation time, and the voltage drop of the power line, the uneven brightness (Mura) generated by the display panel will occur. Besides, at present, most of the display panels are driven by a DC supply, which will cause the light emitting device to be in a positive bias environment and accelerate the aging of the light emitting device.

SUMMARY

There are provided a display device and a pixel driving method according to embodiments of this disclosure. The technical solution is as below.

In the first aspect of the present disclosure, there is provided a display panel, including a plurality of pixel driving circuits arranged in an array along a row direction and a column direction; wherein the display panel further comprises a plurality of first control lines, a plurality of second control lines, a plurality of data lines, and a plurality of power lines; wherein each of the pixel driving circuits is correspondingly connected to the first control line, the second control line, the data line, and two power lines, and the two power lines comprises a first power line and a second power line. The pixel driving circuit includes:

a driving transistor having a control terminal connected to a point G, a first terminal connected to a point D, and a second terminal connected to ground;

a storage capacitor having a first terminal connected to the point G, and a second terminal connected to ground;

a sampling compensation assembly, including a first response terminal connected to the point G, a first connection terminal connected to a point A, and a second connection terminal connected to a point B, the first response terminal being configured to respond to a level signal at the point G to control an on-off state between the first connection terminal and the second connection terminal;

a first switch assembly, including a second response terminal connected to a first control line, a third connection terminal connected to the first power line of the two power lines, and a fourth connection terminal connected to the point B, the second response terminal being configured to respond to a level signal provided by the first control line to control an on-off state between the third connection terminal and the fourth connection terminal;

a second switch assembly, including a third response terminal connected to the second control line, a data writing terminal connected to a data line, a fifth connection terminal connected to the point A, a sixth connection terminal connected to the point B, and a seventh connection terminal connected to the point G, the third response terminal being configured to respond to a level signal provided by the second control line to control an on-off state between the data writing terminal and the fifth connection terminal and an on-off state between the sixth connection terminal and the seventh connection terminal; and a light emitting device having a cathode connected to the point D and an anode connected to the second power line of the two power lines, the second power line being configured to provide a high level signal during a displaying light emitting stage and a low level signal in other stages;

wherein the power lines extend in a row direction, and the power lines and the pixel driving circuit each comprises N rows;

wherein in a first row of the pixel driving circuit, the anode of the light emitting device is connected to a first row of the power line, and the third connection terminal of the first switch assembly is connected to an N-th row of the power line, wherein the first row of the power line is the second power line of the two power lines, and the N-th row of the power line is the first power line of the two power lines;

in an n-th first row of the pixel driving circuit, the anode of the light emitting device is connected to the n-th row of the power line, and the third connection terminal of the first switch assembly is connected to an n-1-th row of the power line; wherein the n-th row of the power line is the second power line of the two power lines, and the n-1-th row of the power line is the first power line of the two power lines;

wherein n and N are positive integers, and $1<n\leq N$.

In a second aspect of the present disclosure, a pixel driving method is provided for driving the above pixel driving circuit, and the pixel driving method includes an initialization stage, a sampling compensation stage, and a displaying light emitting stage:

in the initialization stage, providing a low level signal to an anode of a light emitting device through a second power line, while providing a first level signal to a second response terminal through a first control line, providing a second level signal to a third response terminal through a second control line, providing a third level signal to a third connection terminal through a first power line, and providing a fourth level signal to a data writing terminal through a data line, so as to have the third connection terminal and the fourth connection terminal turned on, the data writing terminal and the fifth connection terminal turned on, and the sixth connection terminal and the seventh connection terminal turned on;

in the sampling compensation stage, providing a low level signal to the anode of the light emitting device through the second power line, while providing a fifth level signal to the second response terminal through the first control line, providing a sixth level signal to the third response terminal through the second control line, providing a seventh level signal to the third connection terminal through the first power line, and providing an eighth level signal to the data writing terminal through the data line, so as to have the third connection terminal and the fourth connection terminal turned off, the data writing terminal and the fifth connection terminal turned on, and the sixth connection terminal and the seventh connection terminal turned on; and in the displaying light emitting stage, providing a high level signal to the anode of the light emitting device through the second power line, while providing a ninth level signal to the second response terminal through the first control line, providing a tenth level signal to the third response terminal through the second control line, providing an eleventh level signal to the third connection terminal through the first power line, and providing a twelfth level signal to the data writing terminal through the data line, so as to have the third connection terminal and the fourth connection terminal turned off, the data writing terminal and the fifth connection terminal turned off, and the sixth connection terminal and the seventh connection terminal turned off.

BRIEF DESCRIPTION OF DRAWINGS

The accompanying drawings, which are incorporated in and constitute a part of the present specification, illustrate embodiments consistent with the disclosure and together with the description serve to explain the principles of the disclosure. Apparently, the drawings in the following description are only some embodiments of the present disclosure, and those skilled in the art can obtain other drawings according to these drawings without creative efforts.

DESCRIPTION OF THE EMBODIMENTS

The exemplary embodiments will now be described more fully with reference to the accompanying drawings. However, the example embodiments can be implemented in a variety of forms and should not be construed as being limited to the examples set forth herein. Rather, these embodiments are provided so that the present disclosure will be more comprehensive and complete, and the concept of example embodiments will be fully communicated to those skilled in the art.

In the present disclosure, the terms "first" and "second" are used for descriptive purposes only, and cannot be understood as indicating or implying relative importance or implicitly specifying the quantity of indicated technical features. Thus, a feature defined as "first" and "second" may explicitly or implicitly include one or more of these features. In the description of the present disclosure, "plurality" means two or more, unless otherwise specifically defined.

In addition, the described features, structures, or characteristics may be combined in any suitable manner in one or more embodiments. In the following description, numerous specific details are provided in order to give a thorough understanding of embodiments of the present disclosure. However, those skilled in the art will realize that the disclosed technical solution can be practiced without one or more specific details, or other methods, components, devices, steps, etc. can be employed. In other cases, the well-known methods, devices, implementations, or operations are not shown or described in detail to avoid blurring various aspects of the present disclosure.

Embodiment 1

Figure 1:
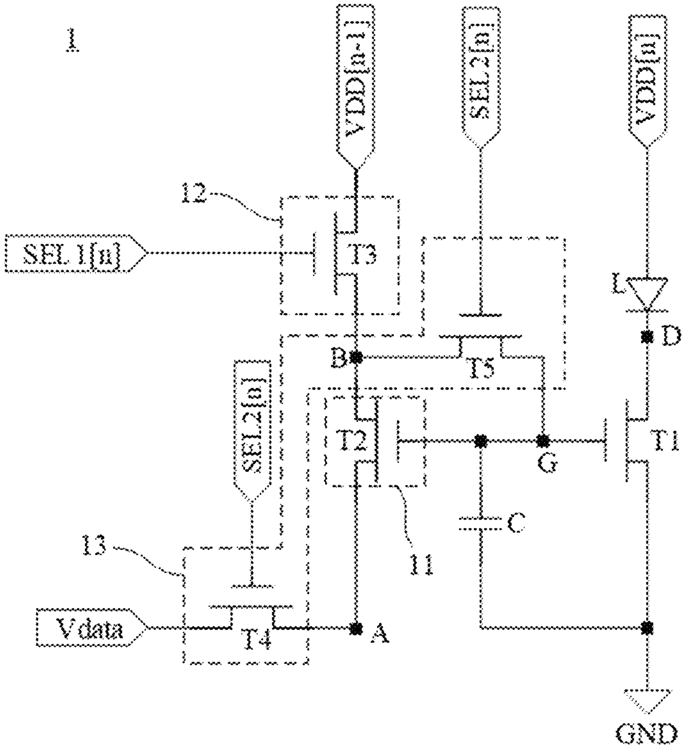
FIG. 1 shows a schematic diagram of a pixel driving circuit according to Embodiment 1 of the present disclosure.

Referring to FIG. 1, an embodiment of the present disclosure provides a pixel driving circuit 1, which may include a driving transistor T1, a storage capacitor C, a sampling compensation assembly 11, a first switch assembly 12, a second switch assembly 13, and a light emitting device L.

The connection relationship among the elements in the pixel driving circuit 1 will be described in detail below.

A control terminal of the driving transistor T1 is connected to a point G, a first terminal of the driving transistor T1 is connected to a point D, and a second terminal of the driving transistor T1 is connected to ground GND, where the control terminal of the driving transistor T1 can be configured to respond to a level signal at point G to control the first terminal and the second terminal of the driving transistor T1 to be in an on state or an off state, that is, to control the on or off between the D point and the ground GND, where the on state between the D point and the ground GND allows current to flow.

The control terminal of the transistor mentioned in the present embodiment can be understood as the gate of the transistor, one of the first terminal and the second terminal can be understood as the source of the transistor, and the other can be understood as the drain of the transistor, depending on the specific type of the transistor and the access conditions in the circuit, which is not limited here. In addition, the source and drain of the transistor are arranged on the same layer and disconnected from each other, so as to reduce the cost.

It should be noted that the ground GND in the present embodiment can be connected to a ground line 6 (shown in FIG. 2), where the ground GND or the ground line 6 can be understood as providing a low level signal, such as zero potential.

A first terminal of the storage capacitor C is connected to point G, and the second terminal of the storage capacitor C is connected to ground GND, which can also be understood that the first terminal of the storage capacitor C is connected to the control terminal of the driving transistor T1, and the second terminal of the storage capacitor C is connected to the second terminal of the driving transistor T1.

For example, the first terminal of the storage capacitor C can be understood as a first electrode, and the second terminal can be understood as a second electrode. The first electrode can be arranged on the same layer as the gate of the driving transistor T1, and the second electrode can be arranged on the same layer as the second terminal of the driving transistor T1. In this way, the number of masking procedures in the manufacturing process can be reduced and the cost can be saved.

A cathode of the light emitting device L is connected to the point D, which can be understood as: the cathode of the light emitting device L is connected to the first terminal of the driving transistor T1, and the anode of the light emitting device L is connected to the second power line. The power provided by the second power line is AC power, and this second power line is configured to provide a high level signal during the displaying light emitting stage, and provide a low level signal during other periods (such as: initialization stage and sampling compensation stage). That is to say, the light emitting device L can be controlled by using AC power to be forward-biased during the light emitting stage, and to be reversed-biased in other stages, so as to reduce the aging rate of the light emitting device L and improve power consumption.

The light emitting device L can be a current-driven light emitting device, which is controlled by the current flowing through the driving transistor T1 to emit light. For example, the light emitting device L may be an organic light emitting diode (OLED). That is, the pixel driving circuit 1 can be applied to OLED display products, and specifically applied to AMOLED (active matrix organic light-emitting diode) products. AMOLED has the advantages of self-illumination, low power consumption, wide viewing angle, high color gamut, high contrast, and fast response.

A sampling compensation assembly 11 may include a first response terminal, a first connection terminal, and a second connection terminal. The first response terminal of the sampling compensation assembly 11 is connected to the point G. In other words, the first response terminal of the sampling compensation assembly 11 is connected to the control terminal of the driving transistor T1 and the first terminal of the storage capacitor C. The first connection terminal of the sampling compensation assembly 11 can be connected to a point A, and the second connection terminal of the sampling compensation assembly 11 can be connected to a point B.

In the present embodiment, the first response terminal of the sampling compensation assembly 11 can be configured to respond to the level signal at point G to control the on-off state between the first connection terminal and the second connection terminal, which can also be understood as to control the on-off state between the point A and the point B.

For example, the sampling compensation assembly 11 may include a sampling compensation transistor T2, where a control terminal of the sampling compensation transistor T2 may serve as the first response terminal mentioned above, a first terminal of the sampling compensation transistor T2 may serve as the first connection terminal mentioned above, and a second terminal of the sampling compensation transistor T2 may serve as the second connection terminal mentioned above.

The control terminal of the sampling transistor and the control terminal of the driving transistor T1 can be arranged on the same layer. The first terminal of the sampling transistor can be arranged on the same layer as the first terminal of the driving transistor T1, and the second terminal of the sampling transistor can be arranged on the same layer as the second terminal of the driving transistor T1, so as to reduce the number of masking processes and save the cost.

A first switch assembly 12 may include a second response terminal, a third connection terminal, and a fourth connection terminal. A second response terminal of the first switch assembly 12 is connected to the first control line 2 (refer to FIG. 2), the third connection terminal of the first switch assembly 12 is connected to the first power line, and the fourth connection terminal of the first switch assembly 12 is connected to the point B. In other words, the fourth connection terminal is connected to the second connection terminal of the sampling compensation assembly 11.

The second response terminal of the first switch assembly 12 can be configured to respond to the level signal provided by the first control line 2 to control the on-off state between the third connection terminal and the fourth connection terminal, that is, to control the on-off state between the first power line and the point B (or the second connection terminal of the sampling compensation assembly 11).

For example, the first switch assembly 12 may include a first switch transistor T3, and a control terminal of the first switch transistor T3 may serve as the second response terminal mentioned above, a first terminal of the first switch transistor T3 may serve as the third connection terminal mentioned above, and the second terminal of the first switch transistor T3 may serve as the fourth connection terminal mentioned above.

The control terminal of the first switch transistor T3 and the control terminal of the driving transistor T1 can be arranged on the same layer, the first terminal of the first switch transistor T3 and the first terminal of the driving transistor T1 can be arranged on the same layer, and the second terminal of the first switch transistor T3 and the second terminal of the driving transistor T1 can be arranged in the same layer, so as to reduce the number of masking procedures and the costs.

A second switch assembly 13 may include a third response terminal, data writing terminal, a fifth connection terminal, a sixth connection terminal, and the seventh connection terminal. A third response terminal of the second switch assembly 13 can be connected to the second control line 3 (referring to FIG. 2), a data writing terminal of the second switch assembly 13 is connected to the data line 5 (referring to FIG. 2), and the fifth connection terminal of the second switch assembly 13 is connected to the point A. In other words, the fifth connection terminal of the second switch assembly 13 is connected to the first connection terminal of the sampling compensation assembly 11, and the sixth connection terminal of the second switch assembly 13 is connected to the point B. In other words, the sixth connection terminal of the second switch assembly 13 is connected to the second connection terminal of the sampling compensation assembly 11, and the seventh connection terminal of the second switch assembly 13 is connected to the point G. In other words, the seventh connection terminal of the second switch assembly 13 is connected to the first response terminal of the sampling compensation assembly 11, the control terminal of the driving transistor T1, and the first terminal of the storage capacitor C.

The third response terminal of the second switch assembly 13 is configured to control the on-off state between the data writing terminal and the fifth connection terminal (the point A or the first connection terminal of the sampling compensation assembly 11) and control the on-off state between the sixth connection terminal and the seventh connection terminal (between the first response terminal and the first connection terminal of the sampling compensation assembly 11), in response to the level signal provided by the second control line 3.

By way of example, the second switch assembly 13 may include a second switch transistor T4 and a third switch transistor T5 having control terminals of the second switch transistor T4 and the third switch transistor T5 connected to the third response terminal, which can be understood as: the control terminals of the second switch transistor T4 and the third switch transistor T5 are connected to the second control line 3, a first terminal of the second switch transistor T4 serves as the data writing terminal aforementioned, a second terminal of the second switch transistor T4 serves as the fifth connection terminal, a first terminal of the third switch transistor T5 serves as the sixth connection terminal, and a second terminal of the third switch transistor T5 serves as the seventh connection terminal.

The control terminals of the second switch transistor T4 and the third switch transistor T5 and the control terminal of the driving transistor T1 can be arranged on the same layer, and the first terminals of the second switch transistor T4 and the third switch transistor T5 and the first terminal of the driving transistor T1 can be arranged on the same layer, the second terminals of the second switch transistor T4 and the third switch transistor T5 and the second terminal of the driving transistor T1 can be arranged on the same layer, so as to reduce the number of masking procedures and the costs.

As an example, the driving transistor T1, the sampling compensation transistor T2, and the first switch transistor T3 to the third switch transistor T5 are of the same type, for example: all of them are P-type transistors or N-type transistors, thus reducing the doping process, which not only saves the cost, but also reduces the difficulty in doping, and can also make the design of each transistor more compact, facilitating the realization of high PPI (pixel density) design.

When the driving transistor T1, the sampling compensation transistor T2 and the first switch transistor T3 to the third switch transistor T5 are of the same type, the first power line can be configured in each stage (for example: the initialization stage, the sampling compensation stage, and displaying light emitting stage) to provide the same level signal for timing control.

The present embodiment is mainly described by taking the driving transistor T1, the sampling compensation transistor T2, and the first switch transistor T3 to the third switch transistor T5 as N-type transistors as an example.

When the driving transistor T1, the sampling compensation transistor T2, and the first switch transistor T3 to the third switch transistor T5 are N-type transistors, the level signals provided by the first power line at each stage can be high level signals.

In the present embodiment, the power provided by the first power line may be DC power, but is not limited thereto, and the power may also be AC power depending on the specific circumstances, as long as the same level signal is provided at each stage.

For example, the parameters of the sampling compensation transistor T2 aforementioned in the present embodiment can be consistent with the parameters of the driving transistor T1, and the parameters mentioned herein can include the threshold voltage, mobility and gate capacitance of the transistor. That is to say, the threshold voltage, mobility and gate capacitance of the sampling compensation transistor T2 are consistent with those of the driving transistor T1, so that the threshold voltage of the sampling transistor can be written into the storage capacitor C during the sampling compensation stage, realizing the compensation of the threshold voltage of the driving transistor T1. Thus, the driving current of the displaying light emitting stage is independent of the threshold voltage of the driving transistor T1, and the impact of reducing the threshold voltage of the driving transistor T1 on the displaying effect is reduced.

When the Pixel Layout design (pixel layout design) on the pixel driving circuit 1 is performed, the position of the sampling compensation transistor T2 can be designed to be closer to the driving transistor T1 than the positions of the first switch transistor T3, the second switch transistor T4 and the third switch transistor T5, so as to better ensure that the parameters of the sampling compensation transistor T2 are consistent with the parameters of the driving transistor T1.

By way of example, the transistors mentioned in the present embodiment, namely: the driving transistor T1, the sampling compensation transistor T2, the first switch transistor T3 to the third switch transistor T5 can be LTPS or Oxide TFT, so as to have good stability and better carrier mobility.

In addition, each transistor can be a bottom-gate type, that is, the control terminal of the transistor is located below the active layer (the side close to the glass substrate), so that the product can be appropriately thinned, but not limited thereto, each transistor can also be a top-gate type, depending on the specific situation.

Each transistor may be an enhancement type transistor or a depletion type transistor, which is not specifically limited in the embodiments of the present disclosure.

Based on the foregoing content, the pixel driving circuit 1 of the present disclosure may include a light emitting device L, a driving transistor T1, a storage capacitor C, a sampling compensation assembly 11, a first control unit, and a second control unit, so as to coordinate with the signals provided by the first control line 2, the second control line 3, the data line 5, the power line 4 (referring to FIG. 2), and the ground line 6, thereby implementing an initialization stage, a sampling compensation stage, and a displaying light emitting stage of the pixel driving circuit 1. The threshold voltage of the driving transistor T1 and the supply voltage are compensated through the aforementioned compensation stage, so that in the displaying light emitting stage, the current flowing through the driving transistor T1 is independent of the threshold voltage of the driving transistor T1 and the supply voltage, but associated to the data signal Vdata provided by the data line 5. That is to say, the pixel driving circuit 1 of the present solution has a compensating effect on the threshold voltage V-th drift of the driving transistor T1 and the voltage drop of the supply voltage, reducing the influence of the threshold voltage V-th and the supply voltage on the driving current, and enhancing the uniformity of displaying.

Embodiment 2

Figure 2:
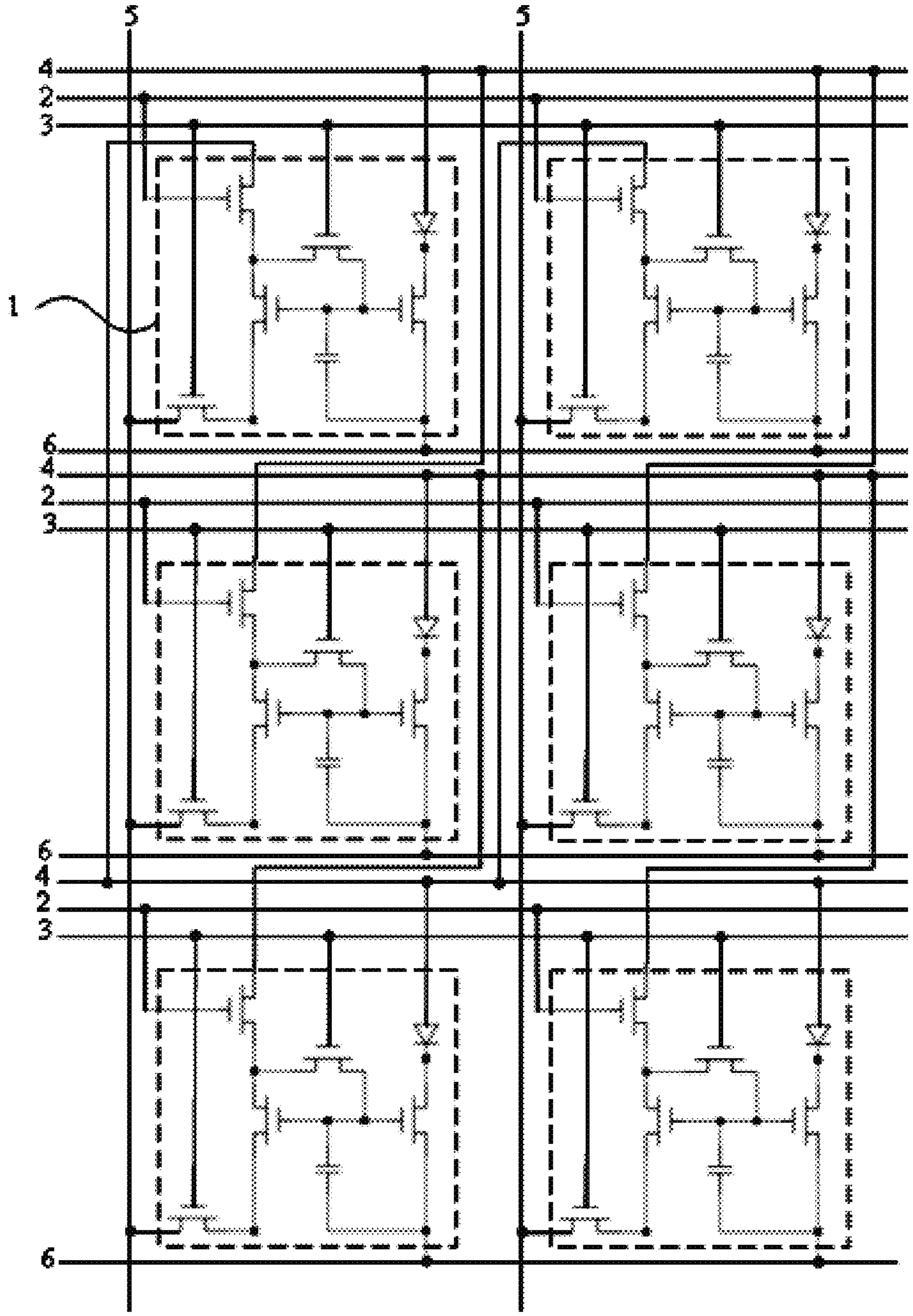
FIG. 2 shows a schematic diagram of a display panel according to Embodiment 2 of the present disclosure.

An embodiment of the present disclosure provides a display panel. As shown in FIG. 2, the display panel may include a plurality of pixel driving circuits 1 arranged in an array along a row direction and a column direction. The architecture of the pixel driving circuit 1 may refer to the content described in Embodiment 1, which will not be repeated herein.

It should be understood that the pixel driving circuit 1 is arranged in a displaying region of the display panel, and the region where the light emitting layer of the light emitting device L in the pixel driving circuit 1 is located can be understood as an opening region of the displaying region. The regions where each transistor and capacitor in the pixel driving circuit 1 are located can be understood as a non-opening region of the displaying region.

The display panel of the embodiments of the present disclosure may include, in addition to the aforementioned pixel driving circuit 1, a plurality of first control lines 2, a plurality of second control lines 3, a plurality of data lines 5, and a plurality of power lines 4. The first control line 2 is configured to provide a first control signal SEL1[n], the second control line 3 is configured to provide a second control signal SEL2[n], the data line 5 is configured to provide a data signal Vdata, and the power line 4 is configured to provide power signal, which can be known in combination with FIG. 1 and FIG. 2.

It should be noted that the first control line 2, the second control line 3, the data line and the power line 4 can be arranged in a non-opening region of the displaying region.

The connection relationship among the first control line 2, the second control line 3, the data line 5, the power line 4, and the pixel driving circuit 1 can refer to the content described in Embodiment 1, and will not be described in detail herein. Detailed description will be made only to the unspecified part as follows:

For example, as shown in FIG. 2, the first control lines 2 and the second control lines 3 of the present embodiment may be arranged at intervals extending in the row direction. The number of the first control lines 2 and the second control lines 3 equals to the number of rows in pixel driving circuit 1, the first control line 2, the second control line 3 and each row of the pixel driving circuit 1 are in one-to-one corresponding connection. For example, each of the first control lines 2, the second control lines 3, and the pixel driving circuit 1 have N rows, where the first control line 2, the second control line 3, and the pixel driving circuit 1 in the p-th row are connected one-to-one with each other, where p and N are positive integers, and $1<p\leq N$.

For example, as shown in FIG. 2, the data lines 5 of the present embodiment can extend in the column direction, and the number of the data lines 5 can be equal to the number of columns of the pixel driving circuit 1. The data line 5 and each column of the pixel driving circuits 1 are in one-to-one corresponding connection. For example: the data line 5 and the pixel driving circuit 1 have M columns, where the data line 5 in the m-th column and the pixel driving circuit 1 in the m-th column are connected in one-to-one connection, where m and M are positive integers, and $1<m\leq M$.

For example, it can be seen from FIG. 1 and FIG. 2 that the power line 4 can extend in the row direction, and the power line 4 and the pixel driving circuit 1 have N rows. In the first row of the pixel driving circuit 1: the anode of the light emitting device L is connected to the first row of the power line 4, and the third connection terminal of the first switch assembly 12 is connected to the power line 4 of the N-th row; in the n-th row of the pixel driving circuit 1: the anode of the light emitting device L is connected to the n-th row of the power line 4, the third connection terminal of the first switch assembly 12 is connected to the n-1-th row of the power line 4, where n and N are positive integers, and $1<n\leq N$.

By way of example, when scanning the n-th pixel driving circuit 1: the n-th row of the power line 4 (that is, equivalent to the aforementioned first power line) can provide a high level signal to the anode of the light emitting device L during the displaying light emitting stage, so that the light emitting device L is in a forward-biased state, and there is current flows through the light emitting device L; and a low level signal is provided to the anode of the light emitting device L in other stages, so that the light emitting device L is in a reversed-biased state, and no current flows through the light emitting device L; and the n-1-th row of the power line 4 (which can be understood as the aforementioned second power line) can provide a high level signal to the third connection terminal of the first switch assembly 12 at various stages.

That is to say, the pixel driving circuits 1 of the current row may use the power signal provided by the power line 4 corresponding to the previous row during the scanning process, so compared with the solution in which each pixel driving circuit 1 corresponds to two power lines 4, the number of power lines 4 can be reduced, thereby limiting line spacing and facilitating the realization of high PPI displaying.

In addition, the non-opening region of the displaying region in the display panel can also be equipped with a ground line 6, and the ground terminal of each row of pixel driving circuits 1 can be connected to the same row of the ground line 6.

Based on the foregoing content, the signal network corresponding to each pixel driving circuit 1 in the embodiments of the present disclosure can be understood as including a data line 5, a power line 4, a ground line 6, and two control lines (for example: the aforementioned first control line 2 and second control line 3), and the pixel driving circuit 1 may use the power line 4 of a previous row as the power supply during the non-light emitting period, which has a compensating effect on the threshold voltage V-th drift of the driving transistor T1 and the voltage drop of the supply voltage, reducing the influence of the threshold voltage V-th and the supply voltage on the driving current, enhancing the uniformity of displaying, and facilitating the high PPI displaying.

In addition, the power provided by the power line 4 is AC power to control the light emitting device L to be forward-biased only in the light emitting stage and reversed-biased in other stages, which can reduce the aging rate of the light emitting device L and improve power consumption.

Embodiment 3

An embodiment of the present disclosure provides a pixel driving method for driving the pixel driving circuit 1 mentioned in Embodiment 1 and Embodiment 2, as shown in FIG. 1 and FIG. 2. The pixel driving method of the present embodiment may include: an initialization stage, a sampling compensation stage, and a displaying light emitting stage, specifically as follows:

combining FIG. 1 to FIG. 2, in the initialization stage, providing a low level signal to an anode of a light emitting device L through a second power line, while providing a first level signal to a second response terminal through a first control line 2, providing a second level signal to a third response terminal through a second control line 3, providing a third level signal to a third connection terminal through a first power line, and providing a fourth level signal to a data writing terminal through a data line 5, so as to have the third connection terminal and the fourth connection terminal be turned on, the data writing terminal and the fifth connection terminal turned on, and the sixth connection terminal and the seventh connection terminal turned on;

in the sampling compensation stage, providing a low level signal to the anode of the light emitting device L through the second power line, while providing a fifth level signal to the second response terminal through the first control line 2, providing a sixth level signal to the third response terminal through the second control line 3, providing a seventh level signal to the third connection terminal through the first power line, and providing an eighth level signal to the data writing terminal through the data line 5, so as to have the third connection terminal and the fourth connection terminal turned off, the data writing terminal and the fifth connection terminal turned on, and the sixth connection terminal and the seventh connection terminal turned on; and in the displaying light emitting stage, providing a high level signal to the anode of the light emitting device L through the second power line, while providing a ninth level signal to the second response terminal through the first control line 2, providing a tenth level signal to the third response terminal through the second control line 3, providing an eleventh level signal to the third connection terminal through the first power line, and providing a twelfth level signal to the data writing terminal through the data line 5, so as to have the third connection terminal and the fourth connection terminal turned off, the data writing terminal and the fifth connection terminal turned off, and the sixth connection terminal and the seventh connection terminal turned off.

The pixel driving method corresponding to the pixel driving circuit 1 in FIG. 1 and FIG. 2 will be described in detail below in conjunction with the working time sequence diagram of the pixel driving circuit 1 shown in FIG. 3.

Figure 3:
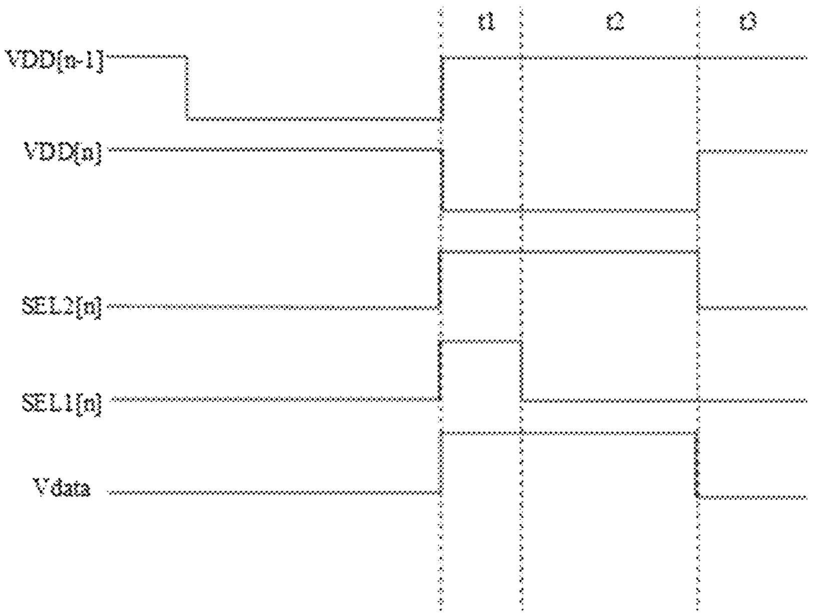
FIG. 3 shows a schematic time sequence diagram of a pixel driving method according to Embodiment 3 of the present disclosure.

The working timing sequence diagram of the pixel driving circuit 1 in FIG. 3 depicts that the first control signal SEL1[n] provided by the first control line 2 to the second response terminal, the second control signal SEL2[n] provided by the second control line 3 to the third response terminal, the data signal Vdata provided by the data line 5 to the data writing terminal, the first power signal VDD[n-1] provided by the first power line to the third connection terminal, and the second power signal VDD[n] provided by the second power line to the anode of the light emitting device L, displaying the level state in the initialization stage t1, the sampling compensation stage t2, and the displaying light emitting stage t3.

In the initialization stage t1: the first power signal VDD [n-1] is high level VDD, the second power signal VDD[n] is low level $V_d$ with a voltage less than 0, the first control signal SEL1[n] and the second control signal SEL2[n] are at high level, the first switch transistor T3, the second switch transistor T4, and the third switch transistor T5 are all turned on. The gates (control terminals) of the sampling compensation transistor T2 and the driving transistor T1 are charged to high level through the first switch transistor T3 and the third switch transistor T5, namely: the voltage at the point G $V_G=V_{DD}$. In this stage, the light emitting device L is in a reversed-biased state, and no current flows through the light emitting device L at all.

In the sampling compensation stage t2: the power signal remains unchanged in this stage, that is, the first power signal $V_{DD}$[n-1] is high level $V_{DD}$, the second power signal $V_{DD}$[n] is low level $V_d$ with a voltage less than 0, the second control signal SEL2[n] maintains a high level, the second switch transistor T4 and the third switch transistor T5 are turned on, and the first control signal SEL1 [n] switches to a low level, the first switch transistor T3 is disconnected and closed, the gate (control terminal) and the drain (second connection terminal) of the compensation sampling transistor are connected through the third switch transistor T5 to form a diode connection, and the potential at the point G starts to discharge until $V_G=V_C=V_{data}+V_{TH-T2}$. In this stage, since the second power signal $V_{DD}$[n] is in a low level negative voltage state, the light emitting device L is in a reversed-biased state and no current flows through the light emitting device L at all. The Vc mentioned here refers to the voltage of the storage capacitor C, $V_{data}$ refers to the voltage provided by the data line 5, and VTH–T2 is the threshold voltage of the compensation sampling transistor.

In the displaying light emitting stage t3: the first power signal $V_{DD}$[n-1] is maintained at high level $V_{DD}$, the second power signal $V_{DD}$[n] switches to high level $V_{DDstate}$, the first control signal SEL1[n] remains at low level, the first switch transistor T3 is turned off, the second control signal SEL2[n] switches to the low level state, the second switch transistor T4 and the third switch transistor T5 are turned off. The light emitting device L in this stage switches to the forward-biased state; and the driving current in this stage flows through the light emitting device L to make it emit light. The driving current can be expressed as:

$$I_{OLED} = 1/2\times\mu\times W/L\times C_{GI}\times(V_{gs}-V_{th})^2$$
$$= 1/2\times\mu\times W/L\times C_{GI}\times(V_G-V_S-V_{th})^2$$

-continued $$= 1/2\times\mu\times W/L\times C_{GI}\times(V_{TH-T2}+V_{Data}-V_{TH-T1})^2$$
$$= 1/2\times\mu\times W/L\times C_{GI}\times(V_{Data})^2;$$

where $V_{TH-T1}$ is the threshold voltage of the driving transistor T1. It can be obtained from the expression that $I_{OLED}$ is only related to the data voltage $V_{data}$ and the threshold voltages of the driving transistor T1 and the sampling compensation transistor T2. In the Pixel Layout design, the parameters of the driving transistor T1 and the sampling compensation transistor T2 are kept consistent and the driving transistor T1 and the sampling compensation transistor T2 are arranged in close positions, so as to control the threshold voltages of the driving transistor T1 and the sampling compensation transistor T2 to be equal, namely:

$$I_{OLED} = 1/2\times\mu\times W/L\times C_{GI}\times(V_{TH-T2}+V_{Data}-V_{TH-T1})^2 \approx 1/2\times\mu\times W/L\times C_{GI}\times(V_{Data})^2;$$

It can be obtained from the above expression that $I_{OLED}$ is only related to the data voltage $V_{data}$ provided by the data signal $V_{data}$. In the expression, μ denotes the electron mobility, $C_{GI}$ denotes the capacitance per unit area of the transistor, W/L denotes the ratio of the channel width to the length of the transistor. These parameters are relatively stable. On such basis, from the calculation formula of the current of the OLED (light emitting device L), it can be understood that the OLED current is only related to the data voltage $V_{data}$, which is controllable, and $\mu\times W/L\times C_{GI}$ is a constant related to the process and driver design. In the embodiments of the present disclosure, the pixel driving circuit 1 shown in FIG. 1 and FIG. 2 is utilized together with the time sequence control shown in FIG. 3, to compensate for the threshold voltage of the driving transistor T1 and the supply voltage, so that during the displaying light emitting stage, the current flowing through the driving transistor T1 is independent of the threshold voltage of the driving transistor T1 and the supply voltage, and only related to the data signal $V_{data}$ provided by the data line 5. That is to say, the pixel driving circuit 1 of the present solution has a compensating effect on the threshold voltage V-th drift of the driving transistor T1 and the voltage drop of the supply voltage, reducing the influence of the threshold voltage V-th and the supply voltage on the driving current, and enhancing the uniformity of displaying.

Based on the content in FIG. 3, it can be seen that the first level signal provided by the aforementioned first control line 2 is a high level signal, and the fifth level signal and the ninth level signal are low level signals; the second level signal and the sixth level signal provided by the second control line 3 are high level signals, and the tenth level signal is a low level signal; the third level signal, the seventh level signal, and the eleventh level signal provided by the first power line are high level signals; the fourth level signal and the eighth level signal provided by the data line 5 are high level signals, and the twelfth level signal is a low level signal.

In the description of the present specification, descriptions referring to the terms "some embodiments", "exemplarily" and the like means that a specific feature, structure, material, or characteristic described in connection with the embodiment or example is included in at least one embodiment or example of the present disclosure. In the present specification, the schematic representations of the above terms are not necessarily directed to the same embodiment or example. Besides, the described specific feature, structure, material or characteristic may be combined in any suitable manner in any one or more embodiments or examples. In addition, those skilled in the art can combine and group different embodiments or examples and features of different embodiments or examples described in the present specification without conflicting with each other.

Although the embodiments of the present disclosure have been shown and described above, it can be understood that the above embodiments are exemplary and should not be construed as limitations on the present disclosure, and those skilled in the art can make changes, modifications, substitutions, and modifications to the aforementioned embodiments within the scope of the present disclosure. Therefore, any changes or modifications made in accordance with the claims and specifications of the present disclosure shall fall within the scope of the present disclosed patent.

What is claimed is:

1. A display panel, comprising:
- a plurality of pixel driving circuits arranged in an array along a row direction and a column direction;
- wherein the display panel further comprises a plurality of first control lines, a plurality of second control lines, a plurality of data lines, and a plurality of power lines;
- wherein each of the pixel driving circuits is correspondingly connected to the first control line, the second control line, the data line, and two power lines, and the two power lines comprises a first power line and a second power line;
- wherein the pixel driving circuit, comprises:
  - a driving transistor having a control terminal connected to a point G, a first terminal connected to a point D, and a second terminal connected to ground;
  - a storage capacitor having a first terminal connected to the point G, and a second terminal connected to ground;
  - a sampling compensation assembly, comprising a first response terminal connected to the point G, a first connection terminal connected to a point A, and a second connection terminal connected to a point B, the first response terminal being configured to respond to a level signal at the point G to control an on-off state between the first connection terminal and the second connection terminal;
  - a first switch assembly, comprising a second response terminal connected to the first control line, a third connection terminal connected to the first power line of the two power lines, and a fourth connection terminal connected to the point B, the second response terminal being configured to respond to a level signal provided by the first control line to control an on-off state between the third connection terminal and the fourth connection terminal;
  - a second switch assembly, comprising a third response terminal connected to the second control line, a data writing terminal connected to the data line, a fifth connection terminal connected to the point A, a sixth connection terminal connected to the point B, and a seventh connection terminal connected to the point G, the third response terminal being configured to respond to a level signal provided by the second control line to control an on-off state between the data writing terminal and the fifth connection terminal and an on-off state between the sixth connection terminal and the seventh connection terminal; and
  - a light emitting device having a cathode connected to the point D and an anode connected to the second power line of the two power lines, the second power line being configured to provide a high level signal during a displaying light emitting stage and a low level signal in other stages;
- wherein the power lines extend in a row direction, and the power lines and the pixel driving circuit each comprises N rows;
- wherein in a first row of the pixel driving circuit, the anode of the light emitting device is connected to a first row of the power line, and the third connection terminal of the first switch assembly is connected to an N-th row of the power line, wherein the first row of the power line is the second power line of the two power lines, and the N-th row of the power line is the first power line of the two power lines;
- wherein in an n-th first row of the pixel driving circuit, the anode of the light emitting device is connected to the n-th row of the power line, and the third connection terminal of the first switch assembly is connected to an n-1-th row of the power line;
- wherein the n-th row of the power line is the second power line of the two power lines, and the n-1-th row of the power line is the first power line of the two power lines;
- wherein n and N are positive integers, and $1<n\leq N$;
- wherein the sampling compensation assembly comprises a sampling compensation transistor having a control terminal serving as the first response terminal, a first terminal serving as the first connection terminal, and a second terminal serving as the second connection terminal;
- the first switch assembly comprising a first switch transistor having a control terminal serving as the second response terminal, a first terminal serving as the third connection terminal, and a second terminal serving as the fourth connection terminal;
- the second switch assembly comprising a second switch transistor and a third switch transistor having control terminals of the second switch transistor and the third switch transistor connected to the third response terminal, a first terminal of the second switch transistor serving as the data writing terminal, a second terminal of the second switch transistor serving as the fifth connection terminal, a first terminal of the third switch transistor serving as the sixth connection terminal, and a second terminal of the third switch transistor serving as the seventh connection terminal;
- wherein the types of the driving transistor, the sampling compensation transistor, the first switch transistor, the second switch transistor, and the third switch transistor are the same;
- wherein the control terminal of the sampling compensation transistor and the control terminal of the driving transistor are arranged on the same layer; wherein the first terminal of the sampling compensation transistor is arranged on the same layer as the first terminal of the driving transistor, and the second terminal of the sampling compensation transistor is arranged on the same layer as the second terminal of the driving transistor.

2. The display panel according to claim 1, wherein the first power line is configured to provide a same level signal in each stage.

3. The display panel according to claim 2, wherein the driving transistor, the sampling compensation transistor, the first switch transistor, the second switch transistor, and the third switch transistor each are N-type transistors.

4. The display panel according to claim 1, wherein the parameters of the sampling compensation transistor are consistent with the parameters of the driving transistor.

5. The display panel according to claim 4, wherein the position of the sampling compensation transistor is provided to be closer to the driving transistor than positions of the first switch transistor, the second switch transistor, and the third switch transistor.

6. The display panel according to claim 5, wherein the parameters comprises threshold voltage, mobility and gate capacitance of the transistor.

7. The display panel according to claim 1, wherein the control terminal of the first switch transistor and the control terminal of the driving transistor are arranged on the same layer, the first terminal of the first switch transistor and the first terminal of the driving transistor are arranged on the same layer, and the second terminal of the first switch transistor and the second terminal of the driving transistor are arranged in the same layer.

8. The display panel according to claim 1, wherein the control terminals of the second switch transistor and the third switch transistor and the control terminal of the driving transistor are arranged on the same layer, the first terminals of the second switch transistor and the third switch transistor and the first terminal of the driving transistor are be arranged on the same layer, and the second terminals of the second switch transistor and the third switch transistor and the second terminal of the driving transistor are arranged on the same layer.

9. The display panel according to claim 1, wherein the driving transistor, the sampling compensation transistor, the first switch transistor, the second switch transistor, and the third switch transistor each are bottom-gate type.

10. The display panel according to claim 1, wherein power provided by the second power line is AC power, and the second power line is configured to provide a high level signal during the displaying light emitting stage, and provide a low level signal during other periods.

11. The display panel according to claim 1, wherein the light emitting device is a current-driven light emitting device, which is controlled by the current flowing through the driving transistor to emit light.

12. A pixel driving method for driving a display panel, the pixel driving method comprising:

an initialization stage, a sampling compensation stage, and a displaying light emitting stage;

wherein the initialization stage comprises: providing a low level signal to an anode of a light emitting device through a second power line, while providing a first level signal to a second response terminal through a first control line, providing a second level signal to a third response terminal through a second control line, providing a third level signal to a third connection terminal through a first power line, and providing a fourth level signal to a data writing terminal through a data line, so as to have the third connection terminal and the fourth connection terminal turned on, the data writing terminal and the fifth connection terminal turned on, and the sixth connection terminal and the seventh connection terminal turned on;

wherein the sampling compensation stage comprises: providing a low level signal to the anode of the light emitting device through the second power line, while providing a fifth level signal to the second response terminal through the first control line, providing a sixth level signal to the third response terminal through the second control line, providing a seventh level signal to the third connection terminal through the first power line, and providing an eighth level signal to the data writing terminal through the data line, so as to have the third connection terminal and the fourth connection terminal turned off, the data writing terminal and the fifth connection terminal turned on, and the sixth connection terminal and the seventh connection terminal turned on; and wherein the displaying light emitting stage comprises: providing a high level signal to the anode of the light emitting device through the second power line, while providing a ninth level signal to the second response terminal through the first control line, providing a tenth level signal to the third response terminal through the second control line, providing an eleventh level signal to the third connection terminal through the first power line, and providing a twelfth level signal to the data writing terminal through the data line, so as to have the third connection terminal and the fourth connection terminal turned off, the data writing terminal and the fifth connection terminal turned off, and the sixth connection terminal and the seventh connection terminal turned off;

wherein the display panel comprises: a plurality of pixel driving circuits arranged in an array along a row direction and a column direction;

wherein the display panel further comprises a plurality of first control lines, a plurality of second control lines, a plurality of data lines, and a plurality of power lines;

wherein each of the pixel driving circuits is correspondingly connected to the first control line, the second control line, the data line, and two power lines, and the two power lines comprises the first power line and the second power line;

wherein the pixel driving circuit comprises:

a driving transistor having a control terminal connected to a point G, a first terminal connected to a point D, and a second terminal connected to ground;

a storage capacitor having a first terminal connected to the point G, and a second terminal connected to ground;

a sampling compensation assembly, comprising a first response terminal connected to the point G, a first connection terminal connected to a point A, and a second connection terminal connected to a point B, the first response terminal being configured to respond to a level signal at the point G to control an on-off state between the first connection terminal and the second connection terminal;

a first switch assembly, comprising the second response terminal connected to the first control line, the third connection terminal connected to the first power line of the two power lines, and the fourth connection terminal connected to the point B, the second response terminal being configured to respond to a level signal provided by the first control line to control an on-off state between the third connection terminal and the fourth connection terminal; and a second switch assembly, comprising the third response terminal connected to the second control line, the data writing terminal connected to the data line, the fifth connection terminal connected to the point A, the sixth connection terminal connected to the point B, and the seventh connection terminal connected to the point G, the third response terminal being configured to respond to a level signal provided by the second control line to control an on-off state between the data writing terminal and the fifth connection terminal and an on-off state between the sixth connection terminal and the seventh connection terminal;

wherein the light emitting device has a cathode connected to the point D and the anode is connected to the second power line of the two power lines, the second power line being configured to provide a high level signal during the displaying light emitting stage and a low level signal in other stages;

wherein the power lines extend in a row direction, and the power lines and the pixel driving circuit each comprises N rows;

wherein in a first row of the pixel driving circuit, the anode of the light emitting device is connected to a first row of the power line, and the third connection terminal of the first switch assembly is connected to an N-th row of the power line, wherein the first row of the power line is the second power line of the two power lines, and the N-th row of the power line is the first power line of the two power lines;

wherein in an n-th first row of the pixel driving circuit, the anode of the light emitting device is connected to the n-th row of the power line, and the third connection terminal of the first switch assembly is connected to an n-1-th row of the power line;

wherein the n-th row of the power line is the second power line of the two power lines, and the n-1-th row of the power line is the first power line of the two power lines;

wherein n and N are positive integers, and $1<n\leq N$;

wherein in the sampling compensation stage, the light emitting device is in a reversed-biased state;

wherein in the displaying light emitting stage, the light emitting device switches to a forward-biased state.

13. The pixel driving method according to claim 12, wherein the first level signal provided by the first control line is a high level signal, and the fifth level signal and the ninth level signal are both low level signals;

wherein the second level signal and the sixth level signal provided by the second control line are both high level signals, and the tenth level signal is a low level signal;

wherein the third level signal, the seventh level signal, and the eleventh level signal provided by the first power line each are high level signals; and wherein the fourth level signal and the eighth level signal provided by the data line are both high level signals, and the twelfth level signal is a low level signal.

14. The pixel driving method according to claim 12, wherein in the displaying light emitting stage, threshold voltages of the driving transistor and the sampling compensation transistor are controlled to be equal.

15. The pixel driving method according to claim 14, wherein a driving current of the light emitting device is calculated by:

$$I_{OLED}=\frac{1}{2}\times\mu\times W/L\times C_{GI}\times(V_{Data})^2$$

where $I_{OLED}$ denotes the driving current of the light emitting device, $\mu$ denotes electron mobility, $C_{GI}$ denotes capacitance per unit area of the light emitting device, which is a transistor, W/L denotes a ratio of a channel width to the length of the transistor, $V_{data}$ denotes data voltage provided by the data signal.

16. The pixel driving method according to claim 12, wherein the sampling compensation assembly comprises a sampling compensation transistor having a control terminal serving as the first response terminal, a first terminal serving as the first connection terminal, and a second terminal serving as the second connection terminal;

the first switch assembly comprising a first switch transistor having a control terminal serving as the second response terminal, a first terminal serving as the third connection terminal, and a second terminal serving as the fourth connection terminal;

the second switch assembly comprising a second switch transistor and a third switch transistor having control terminals of the second switch transistor and the third switch transistor connected to the third response terminal, a first terminal of the second switch transistor serving as the data writing terminal, a second terminal of the second switch transistor serving as the fifth connection terminal, a first terminal of the third switch transistor serving as the sixth connection terminal, and a second terminal of the third switch transistor serving as the seventh connection terminal;

wherein the types of the driving transistor, the sampling compensation transistor, the first switch transistor, the second switch transistor, and the third switch transistor are the same.

* * * * *